June 13, 1972 — G. KOHLER — 3,669,518
FOOTSTEP BEARING
Filed June 17, 1970
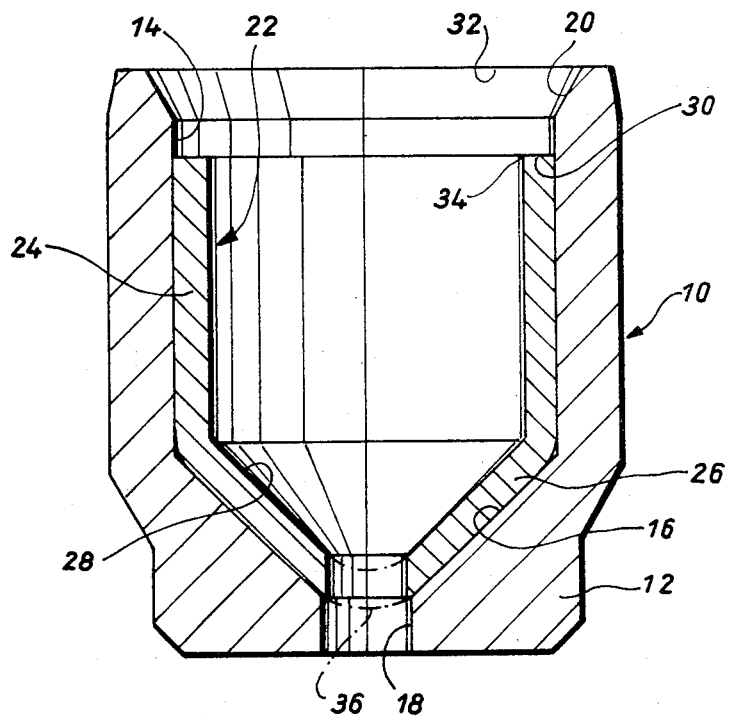
Inventor:
GISBERT KOHLER
by Murry Schaffer Atty

3,669,518
FOOTSTEP BEARING
Gisbert Kohler, Stuttgart, Germany, assignor to SKF Kugellagerfabriken G.m.b.H., Schweinfurt, Germany
Filed June 17, 1970, Ser. No. 46,906
Claims priority, application Germany, June 19, 1969,
G 69 24 371.6
Int. Cl. F16c *17/10, 33/04*
U.S. Cl. 308—156          7 Claims

ABSTRACT OF THE DISCLOSURE

A footstep bearing for spinning and twisting spindles comprising a carrier having a cylindrical interior and a conically formed lower end. A bearing box separably formed having a complementary shape is press fit within the carrier. The bearing box is thin walled made of sheet bearing material while the carrier walls are of thicker dimension, of non-bearing material and provide support for the bearing load exerted thereon.

BACKGROUND OF THE INVENTION

The present invention relates to a footstep bearing for yarn spinning and twisting spindles.

Such bearings are, as is well known, intended to be mounted on a housing and to rotatably support within it a spindle foot. Conventionally, such bearings are machined from a solid rod or bar stock to have an internal bearing cavity provided with a lower conical surface to support the spindle foot. Since the material used must have desirable bearing characteristics, it is generally made of expensive material such as bronze. During the machining operation, much material is comminuted and thus lost, consequently resulting in an extremely expensive part as well as in a part heavy and somewhat cumbersome to use.

It is the object of the present invention to provide a footstep bearing of improved design.

It is an object of the present invention to provide a footstep bearing the cost of production of which is greatly reduced.

It is a specific object of the present invention to provide a footstep bearing constructed of generally inexpensive materials.

It is also an object of the present invention to provide a footstep bearing for spinning and twisting spindle which has wide and versatile application.

The objects as well as others together with numerous advantages will be seen from the following description of the invention.

SUMMARY OF THE INVENTION

According to the present invention, a footstep bearing for spinning and twisting spindles is provided comprising a carrier having a cylindrical interior and a conically formed lower end. A bearing box separably formed having a complementary shape is press fit within the carrier. The bearing box is thin walled made of sheet bearing material while the carrier walls are of thicker dimension, of non-bearing material and provide support for the bearing load exerted thereon.

Preferably, the apex of the carrier and bearing box conical portions are open providing a passage which may communicate with a source of lubricating fluid.

Full details of the present invention are set forth in the following description.

BRIEF DESCRIPTION OF DRAWING

Reference is made to the single drawing accompanying this description in which the only figure shows a vertical cross section of the footstep bearing of the present invention.

DESCRIPTION

As seen from the drawing, the footstep bearing according to the present invention comprises a carrier body 10, rotatably symmetrical about a central axis, and having an intergally formed foot portion 12 of smaller diameter. The carrier body 10 is provided with an internal recess 14 which is cylindrical about the central axis while the foot portion 12 is provided with a conically tapering bottom surface 16, through the apex of which is formed a central outlet passage 18. The carrier body 10 is formed, at its upper end, with an outward flaring conically enlarged lip portion 20.

Press fit into the recess 14 is a separable, independently formed thin walled bearing box 22 made from a single unitary seamless sheet of deformable bearing material to have a hollow interior and an exterior conforming to the recess 14. The bearing box 22 is thus formed with a cylindrical portion 24 having an outer cross sectional dimension conforming to the cylindrical recess 14 and a lower conical end portion 26, integrally formed therewith, which is complementary to the conical shape of the bottom surface 16. The upper portion 24 defines a cavity and the lower portion a bearing surface 28 for supporting the foot of a spinning or twisting spindle mounted thereon.

Preferably, the bearing box is drawn pressed or otherwise shaped from a single circular sheet or blank of suitable bearing material such as the aforementioned bronze or alloys equivalent thereto such as tin-bronze, so that it has a wall thickness less than 3 mm. The axial length of the cylindrical portion 24 of the bearing box 22 is less than that of the recess 14. The upper edge annular face 30 is thus axially offset from the annular upper edge face 32 of carrier body 10 and the bearing box is fully located in the cylindrical portion of the recess 14 permitting the spindle foot to be set into the footstep bearing through the outwardly flaring conical portion 20 without the possibility of any damage to the inner circumferential edge 34 of the cylindrical bearing box portion 24.

A indicated by the dotted lines in the drawing, the bearing box is initially formed during the drawing process with an axially closed conical end portion 36 which is stamped out or opened after insertion of the bearing box into the supporting body, so that the central passage 18 extends both through the foot 12 of the support body 10 as well as through the internally located bearing box 22. This passage 18 provides a suitable connection to an oil sump (not shown) of the spindle bearing housing which receives the footstep bearing.

It will be obvious that the inner circumferential surface of the bearing box portion 24 is preferably of circularly cylindrical cross section; however, it may be uniformly conically tapered in the direction of end piece 26. This depends on the specific form of the spindle foot for which the bearing is to be provided.

Thus it will be seen that a footstep bearing is provided having a supporting or carrier body 10, a separate bearing box 22 (formed with the desired bearing cavity) prepared from a piece of thin walled sheet bearing metal. In this arrangement, bearing metal is required only for the bearing box which may be prepared from a circular blank or piece of sheet metal capable of being deformed and inserted into the carrier in the most simple manner. When the bearing box is suitably dimensioned, only a small fraction of the total mass of the footstep bearing is required to be made of bearing metal as compared to conventional footsteps which are prepared entirely of bearing metal.

Although the labor required for preparing footstep bearings according to the present invention may be costlier as compared to the manufacture of known footstep bearings because of the requirement for separately shaping the carrier 10 and the bearing box 22 and for assembling these parts, it has been calculated that the cost reduction available through savings in the materials alone amounts to at least 30%. This cost reduction is extended also by the fact that the carrier or support 10 can be made of inexpensive material such as plastic of adequate strength or of inexpensive metal even though of thicker material. A plastic body can be prepared by injection molding while the inexpensive metal sheet metal may be easily formed or machined on automatic lathes.

The bearing box 22 is preferably made of bronze sheet material, and more particularly of a tin-bronze alloy since such sheets are capable of being easily deep drawn and can be worked in thickness smaller than 3 mm. Thus, minimal amounts of expensive bearing material need be used.

The recess 14 in the carrier or support which receives the bearing box 22 may be of cylindrical cross section and pass entirely through the carrier or support. However, it is preferred to provide the recess in the support or carrier with the lower conical bottom surface which is complementary to the conical bearing surface of the bearing box. A backing is thus provided for the bearing portion of the bearing box and offers several structural advantages, namely the ability to absorb stress and strain and carry the major portion of the bearing load. It is preferred that the particular wall thickness of the bearing box be less than 3 mm. after it has been set into the support or carrier. In order to insure proper dimensioning of the bearing box, a suitable calibrating mandril is introduced therein with the conical bottom surface of the support serving as a pressure backing. This backing permits pressure to be exerted to the surface of the bearing box by means of the calibrating mandril achieving cold working and consequent strengthening of the bearing portion while simultaneously dimensioning the thickness of the wall. The conical shape of the bottom surface in the carrier will be thus made very precisely since the surface of the bearing box assumes the shape of the support surfaces during calibrating and cold working. This cold working technique means that the bearing box can be shaped by deep drawing with a relatively generous tolerance because the support or carrier, so to speak, forms a mold in which the bearing box can readily and quickly be brought to very precise dimensions.

Another advantageous feature arises from the provision of the central passage 18 which extends through the conical bearing portion of the bearing box and the carrier. Oil can thus be supplied through this passage directly to bearing surface of the spindle surface.

The offset of annular frontal surface of the bearing box axially from the corresponding end of the support or carrier and that the recess of the support or carrier be conical enlargement adjacent to or ahead of the annular frontal face of the bearing box also is advantageous in insuring that the lower end of the spindle does not make contact with the inner circumferential edge of the bearing box when the lower spindle end is inserted into the bearing.

The single embodiment shown is illustrative of the present invention. Many changes and modifications are described. Numerous others will be obvious to those skilled in this art. Consequently, the illustration is not to be taken as limiting of the present invention.

What is claimed:

1. A footstep bearing for yarn spinning and twisting spindles comprising a support, adapted to be mounted in a housing, having a cylindrical bearing cavity, and an inwardly directed conical bearing step at one end axially supporting a rotating spindle, a separable bearing box located within said support and formed to conform with the contour of said cavity and said step, said bearing box being made from a single seamless sheet of deformable metal and press fit within said cavity to be fixed with respect thereto.

2. The bearing according to claim 1 wherein said support is made of a thick walled material and said bearing box is made of thin walled sheet of bronze or bronze-alloy.

3. The bearing according to claim 2 wherein said support is made of plastic.

4. The bearing according to claim 2 wherein said support is made of steel.

5. The bearing according to claim 2 wherein said bearing box has a wall thickness less than 3 mm.

6. The bearing according to claim 1 wherein said conical portions are provided with an axially aligned opening extending from the exterior of said support into said cavity.

7. The bearing according to claim 1 wherein the bearing box is axially offset from the adjacent end of said support and said support is provided with a conically tapering lip extending radially outwardly.

References Cited

UNITED STATES PATENTS

| 1,603,022 | 10/1926 | Briney | 308—237 |
| 2,741,018 | 4/1956 | Schaefer | 308—237 X |
| 88,556 | 4/1869 | Draper | 308—156 |
| 96,407 | 11/1869 | Dunklee | 308—156 |

MARTIN P. SCHWADRON, Primary Examiner

B. GROSSMAN, Assistant Examiner

U.S. Cl. X.R.

308—159, 237